United States Patent

Gussin et al.

[11] Patent Number: 5,266,980
[45] Date of Patent: Nov. 30, 1993

[54] SYNCHRONIZED AUDIO VISUAL STORY-TELLING TOY

[76] Inventors: Edward L. Gussin, 5772 Ridgebrook Dr.; Donald G. Ratner, 29300 Whittingham Ct.; Paul R. Feinsinger, 5744 Green Meadow Dr., all of Agoura Hills, Calif. 91301

[21] Appl. No.: 853,823

[22] Filed: Mar. 19, 1992

[51] Int. Cl.⁵ .................................... G03B 31/06
[52] U.S. Cl. .................................... 353/19; 352/17; 352/12
[58] Field of Search .................... 353/19, 15; 446/175, 446/485, 484; 352/12, 15, 16, 17, 174, 176, 25

[56] References Cited

U.S. PATENT DOCUMENTS

| | | | |
|---|---|---|---|
| 3,675,994 | 7/1972 | Badalich | 353/19 |
| 3,799,420 | 3/1974 | Badalich | 353/19 |
| 3,832,049 | 8/1974 | Sato | 353/19 |
| 3,874,787 | 4/1975 | Taylor | 353/15 |
| 4,037,951 | 7/1977 | Aoki | 353/19 |
| 4,067,647 | 1/1978 | Gallina | 353/19 |
| 4,072,989 | 2/1978 | Grant | 353/15 |
| 4,165,159 | 8/1979 | Landau et al. | 353/15 |
| 4,277,152 | 7/1981 | Taylor | 353/19 |
| 4,363,055 | 12/1982 | Lee | 353/15 |

Primary Examiner—William A. Cuchlinski, Jr.
Assistant Examiner—William C. Dowling

[57] ABSTRACT

An audio visual story-telling toy projects pictures on a surface such as a ceiling or a wall while a story recorded on an audio cassette is played. The toy is a small, self-contained unit which includes a tape player and a synchronized picture strip projector. The toy includes an insertable, removable cartridge containing film with picture frames sequenced to correspond to the story on the tape.

14 Claims, 5 Drawing Sheets

SYNCHRONIZED AUDIO VISUAL STORY-TELLING TOY

BACKGROUND OF THE INVENTION

1. Field of the Invention

This invention provides a simple, synchronized, mechanical audio/visual electronic toy which can be made economically and can be operated easily by a child. The term "synchronized" means that the images that the toy projects are changed to correspond to the playback of the recorded story. Tone pulses recorded on the audio tape are used to signal a mechanism to change to the next picture. The placement of tone pulses on the audio tape determines when the pictures are to change.

2. Prior Art

Generally, synchronized slide or film projection systems require complex projectors and audio devices. These expensive systems are typically used for professional slide presentations such as sales meetings, technical discussions, or educational uses. The complexity of the equipment requires a significant amount of set-up, including loading of the slides or film and audio tape, and interconnection cabling between the various units. Set-up requires one skilled and knowledgeable in the operation of such equipment. The high cost, physical size, and delicate nature of the set-up and operation of such equipment preclude its use as a child's toy to display a child's stories for a child's enjoyment.

SUMMARY OF THE INVENTION

The invention relates to a synchronized audio/visual story-telling toy which projects pictures on a surface such as a screen, ceiling or wall in synchronization with the playback of a story recorded on an audio tape or cassette. This toy is easily operated by, and is therefore suitable for use by children.

In preferred embodiments, this toy includes a housing that comprises a projector for directing light through one or more picture frames and onto a display surface such as a wall, ceiling or screen. A picture cartridge adapted by size and shape for insertion into the housing comprises a strip, preferably a film strip, including a plurality of picture frames arranged in a desired sequence. The cartridge has a size and shape such that each of the picture frames can be placed in a desired sequence in the path of light from the projector. The housing also comprises means for advancing a strip of picture frames into the path of light from the projector in increments of at least one picture frame at a time.

The housing includes a holder for the picture cartridge. With the cartridge in the holder, the picture frames on the strip can pass over the projector and into the path of light from the projector. The housing also includes an audio tape player with a speaker for reproducing sound that corresponds to the picture frames on the strip from a pre-recorded audio tape. The tape player also reproduces electronic synchronization signals from such tapes to actuate the mechanism for advancing the picture frames on the strip across the path of light from the projector. The housing also includes a detector for these synchronization signals, and a mechanism for starting the strip advancing mechanism in response to such synchronization signals to move a desired picture frame at the desired time into the path of light from the projector in synchronization with the story played by the tape player.

It is an object of this invention to provide a synchronized audio/visual story-telling toy which projects pictures onto a surface as a story recorded on an audio cassette is played.

Another object of this invention to provide a synchronized audio visual toy which projects pictures contained on a strip of film onto a surface while a tape recorded story is played.

Another object of this invention is to provide a synchronized audio visual toy which, during playback of an audio-taped story, projects onto a viewing surface pictures contained on a strip of film in a small plastic cartridge that is adapted to be inserted into the toy.

Another object of this invention is to provide a synchronized audio visual toy which projects slide pictures as a story is played in which the audio sound such as spoken narration, character voices, and music is recorded on a standard magnetic audio cassette tape.

Another object of this invention to provide a synchronized audio visual toy which projects pictures as a story recorded on an audio cassette is played in which the projected pictures are synchronized to the story by tone pulses recorded on the audio cassette that trigger a mechanism to advance the pictures one or more frames at a time.

The above description as well as further objects, features and advantages of the present invention will be more fully understood by reference to the following detailed description of the presently preferred, illustrative embodiment in accordance with the present invention, when taken in conjunction with the accompanying drawings.

DESCRIPTION OF THE DRAWINGS

FIG. 6 is a block diagram of the electronic circuit which synchronously advances the film in the toy embodiment shown in FIGS. 1-5.

DESCRIPTION OF THE PREFERRED EMBODIMENT

Figure 1:
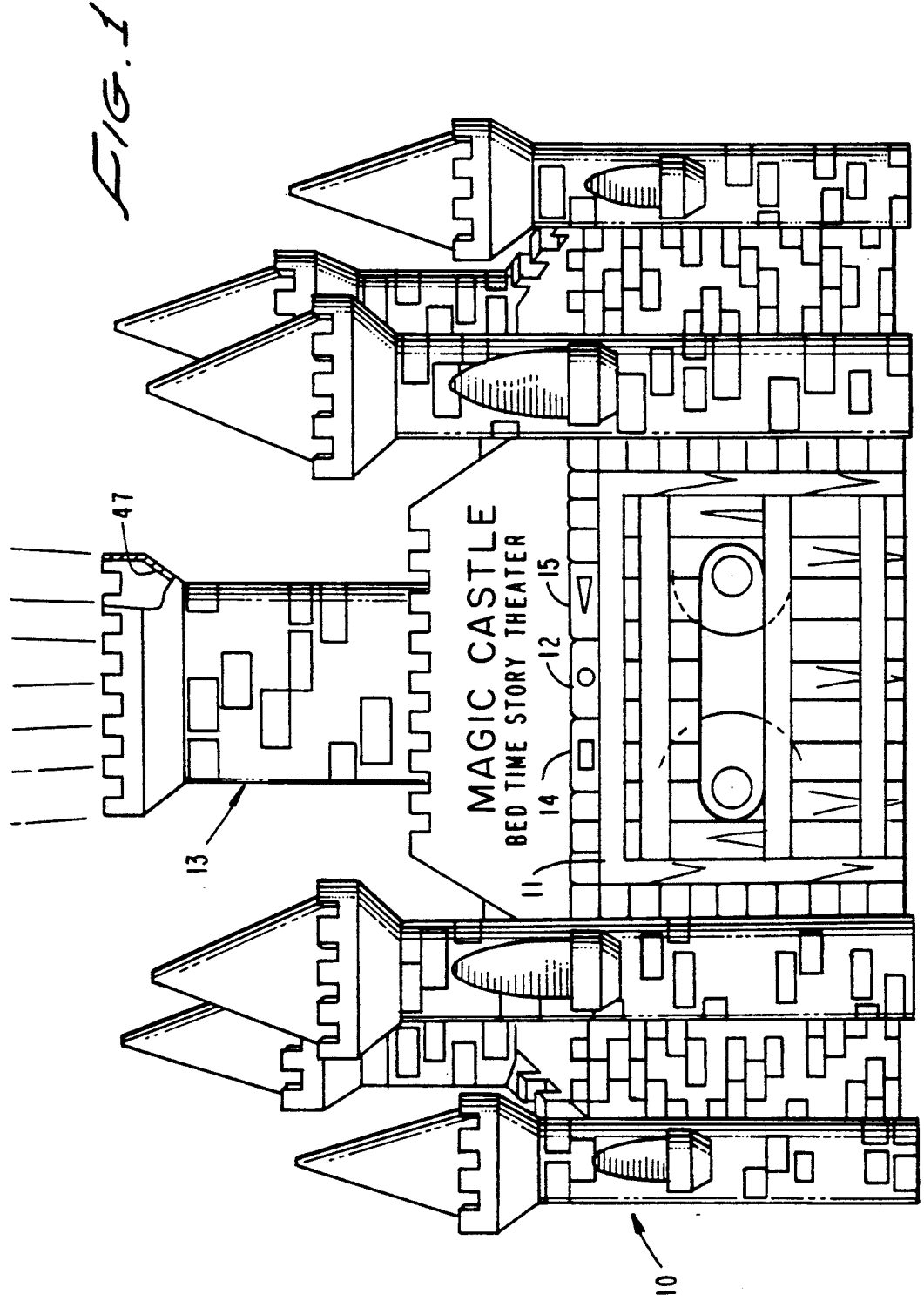
FIG. 1 is a perspective view of a preferred embodiment of a synchronized audio visual story-telling toy which projects pictures on a surface while a story recorded on an audio tape is played.

Referring to FIG. 1, a synchronized audio visual story-telling toy is generally represented by the numeral 10. A standard audio cassette tape is inserted into tape door 11, and a picture cartridge containing a small roll of 16 millimeter film is inserted into an opening in the back of the unit. The picture cartridge latches in place. When play button 12 is pressed, the first scene of the story is automatically aligned with lens 13, a picture is projected on the ceiling or other surface above the unit, and the story lines for the first scene are played.

Short tone pulses on the tape, which are inaudible, electronically signal the unit to advance to the next or later frame at the proper time. Individual scenes can appear for any length of time, with some shown in rapid succession for the appearance of motion or action. After the last scene is projected, the tape player automatically shuts off, and the picture cartridge automatically rewinds. The audio cassette tape is recorded on both sides, enabling the user to replay the story without rewinding the tape by simply removing the tape and inserting it on the other side. Depressing stop button 14 stops the tape and film at any point in the story. Activating button 15 rewinds the tape and picture cartridge if the store is interrupted before reaching the end of the story.

Figure 2:
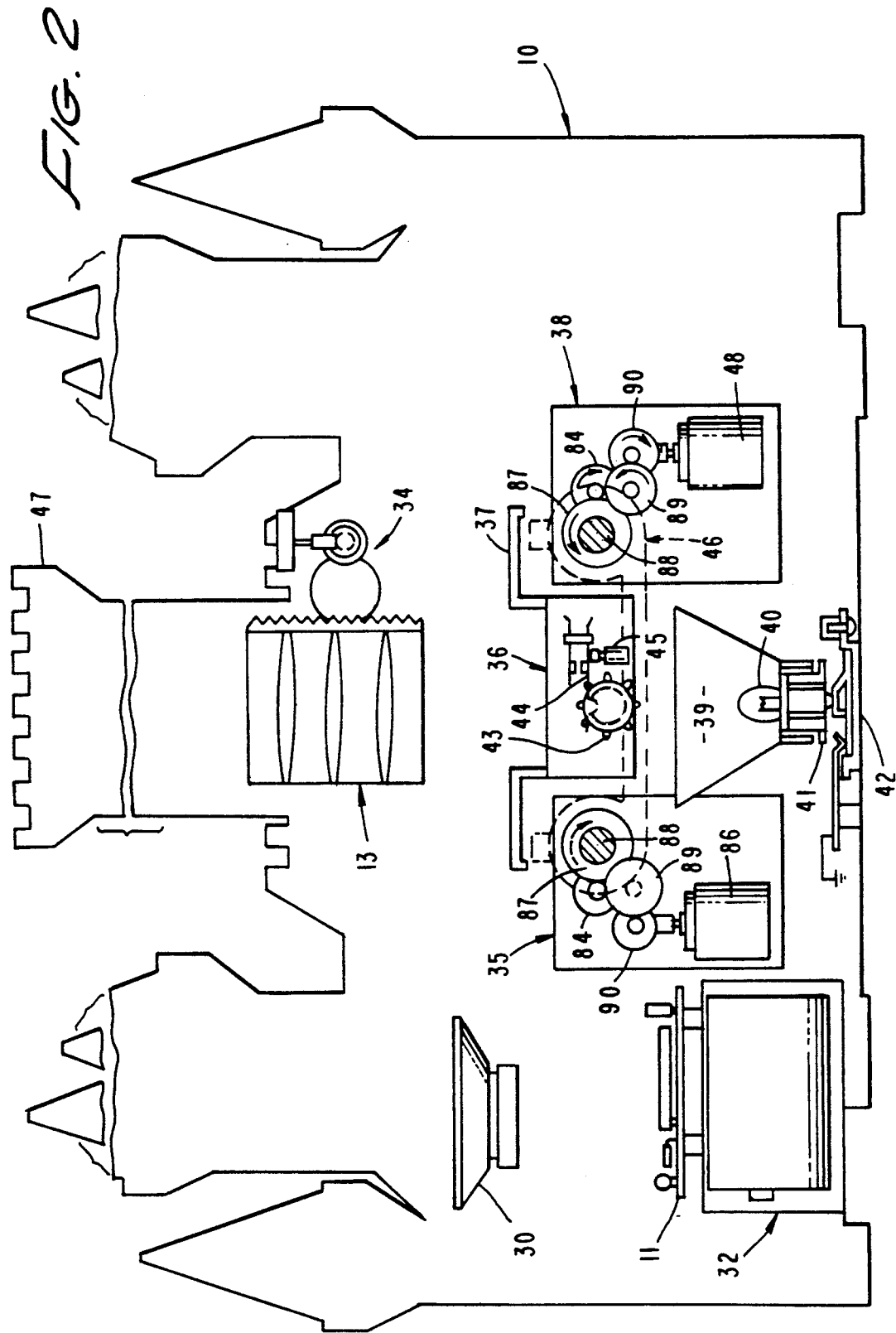
FIG. 2 is a rear elevation view of the internal components of the toy embodiment in FIG. 1.

FIG. 2 shows a rear elevation view of the internal components of toy 10. Projection light is produced by a small 6 volt electric light bulb 40 which is held in place by bulb holder 41. Reflector 39 directs light upwardly through the film contained in picture cartridge 46. The image is focused by lens 13, and is projected through opening 47 in the top of the unit. Lens 13 is adjusted up or down to focus the image on the ceiling using focus mechanism 34. A removable cover 42 is provided for replacement of the bulb 40.

The film contained in the picture cartridge 46 is configured such that each picture frame lines up with a sprocket hole in the film. The film is advanced one or more frames at a time by an advance mechanism including advance gear box 38 and counting unit 36. Tone pulses recorded on the audio cassette tape are detected by an electronic circuit housed in circuit board 31.

Each time a pulses is detected, indicating that the picture is to advance one or more frames, the circuit starts the motor 48 in the advance gear box 38 which moves the film forward. As the film moves, the sprocket wheel 43 in the counting unit 36 turns. A detent in the sprocket wheel 43 indicates that a picture frame is aligned with lens 13. As the film moves into this position, a lever 44 snaps into the detent to stop the film at the correct spot. The lever 44 is pushed out of the detent by a solenoid 45 each time the motor 48 starts to move the film. An arm 37 attached to the counting unit 36 is used to lift the counting unit 36 off the film when the picture cartridge 46 is removed. The film contained in the picture cartridge 46 is rewound automatically at the end of the story by the rewind gear box 35. The toy is powered by four "D" cells contained in battery compartment 32. Speaker 30 is connected to the output of an audio cassette player to produce the sound portion of the story.

Figure 3:
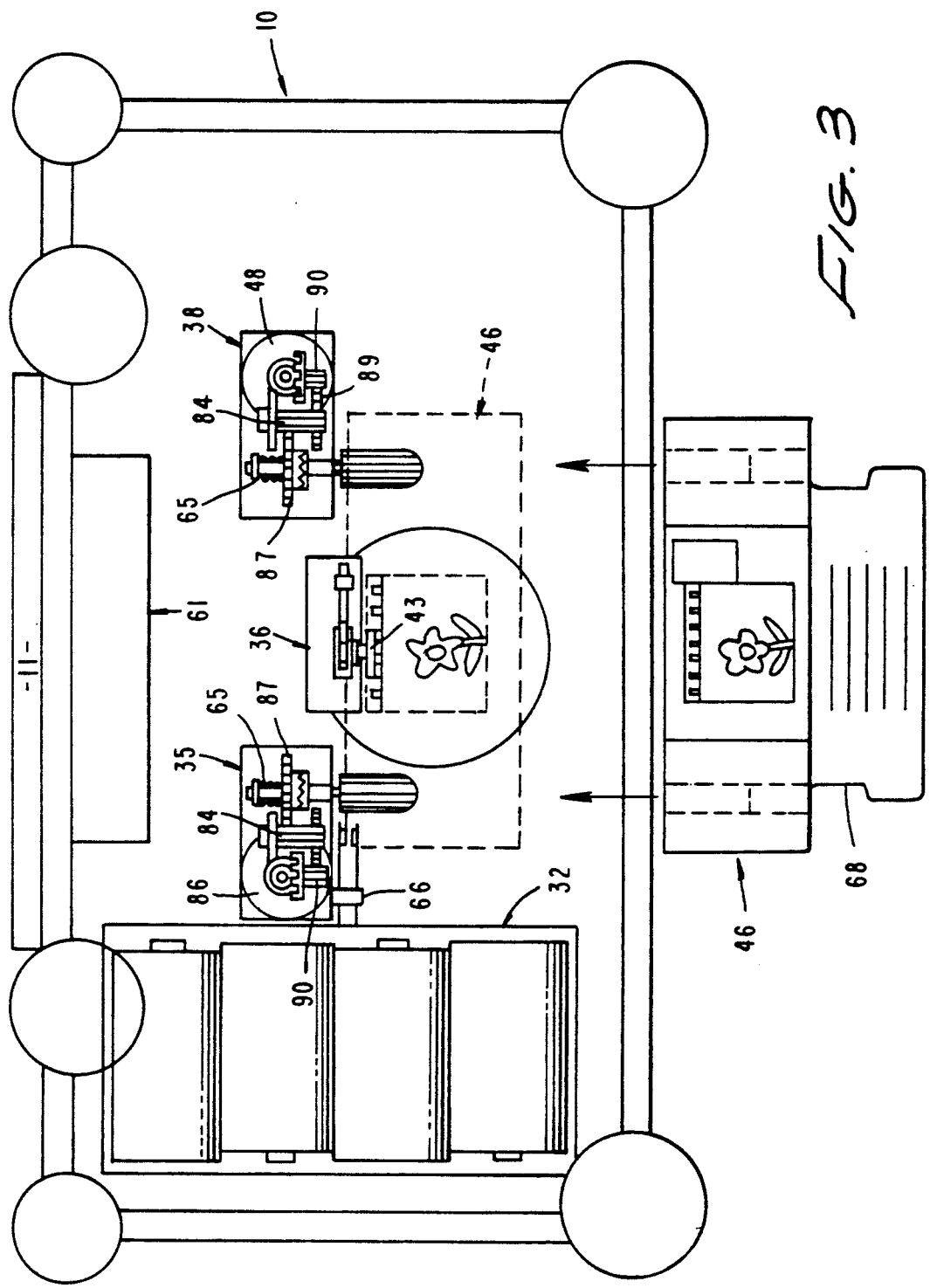
FIG. 3 is a top plan view of the internal components of the toy embodiment of FIGS. 1 and 2.

Referring to FIG. 3, a top plan view of the internal components is shown. The picture cartridge 46 is shown inserted into the unit. A handle 68 is provided to facilitate the insertion and removal of the picture cartridge 46. The battery compartment 32 is shown with all four "D" cells in view. The audio cassette player 61 is positioned at the front of the unit. A switch 66 is provided to indicate that the picture cartridge 4 is in place. The advance gear box 38, rewind gear box 35, and counting unit 36 are shown in their relative position to the picture cartridge 46. A clutch 6 is provided in the advance gear box 38 and rewind gear box 35 to prevent over winding of the film in the picture cartridge 46 and the motors.

Figure 4:
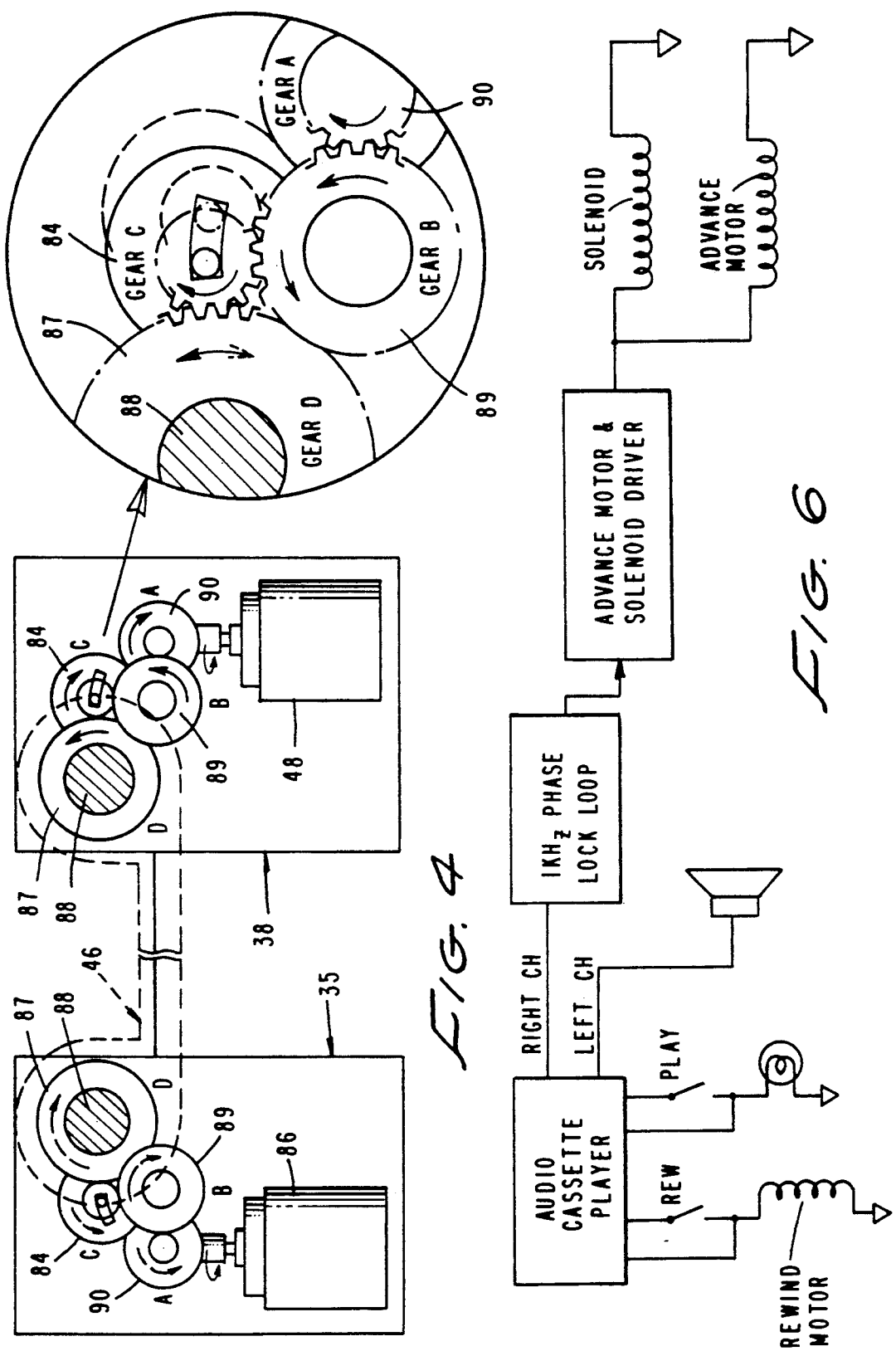
FIG. 4 is a side elevation view of the film advance and film rewind mechanisms for the toy embodiment shown in FIGS. 1-3.

FIG. 4 shows the operation of the single direction actuating gear box used for the advance gear box 38 and the rewind gear box 35. The picture cartridge 46 is shown in dotted lines. As the advance motor 48 is started, gear A 90 turns clockwise, turning gear B 89 counter-clockwise, which drives gear C 84 to the position shown in solid lines. Gear C 84 engages gear D 87, which turns shaft 88 counter-clockwise, advancing the film in picture cartridge 46.

The rewind gear box 35 operates the same way to rewind the film in the picture cartridge 46. When the rewind motor 86 is started, the film causes the shaft 88 to turn clockwise, turning gear D 87 clockwise. This causes gear C 84 to escape from the position shown in solid lines to the position shown in dotted lines. Gear C 84 thus stops turning, protecting the advance gear box 38 and the advance motor 48. Gear C 84 in the rewind gear box 35 functions the same way to protect the rewind gear box 35 and rewind motor 86 when the advance motor 48 is turning.

Figure 5:
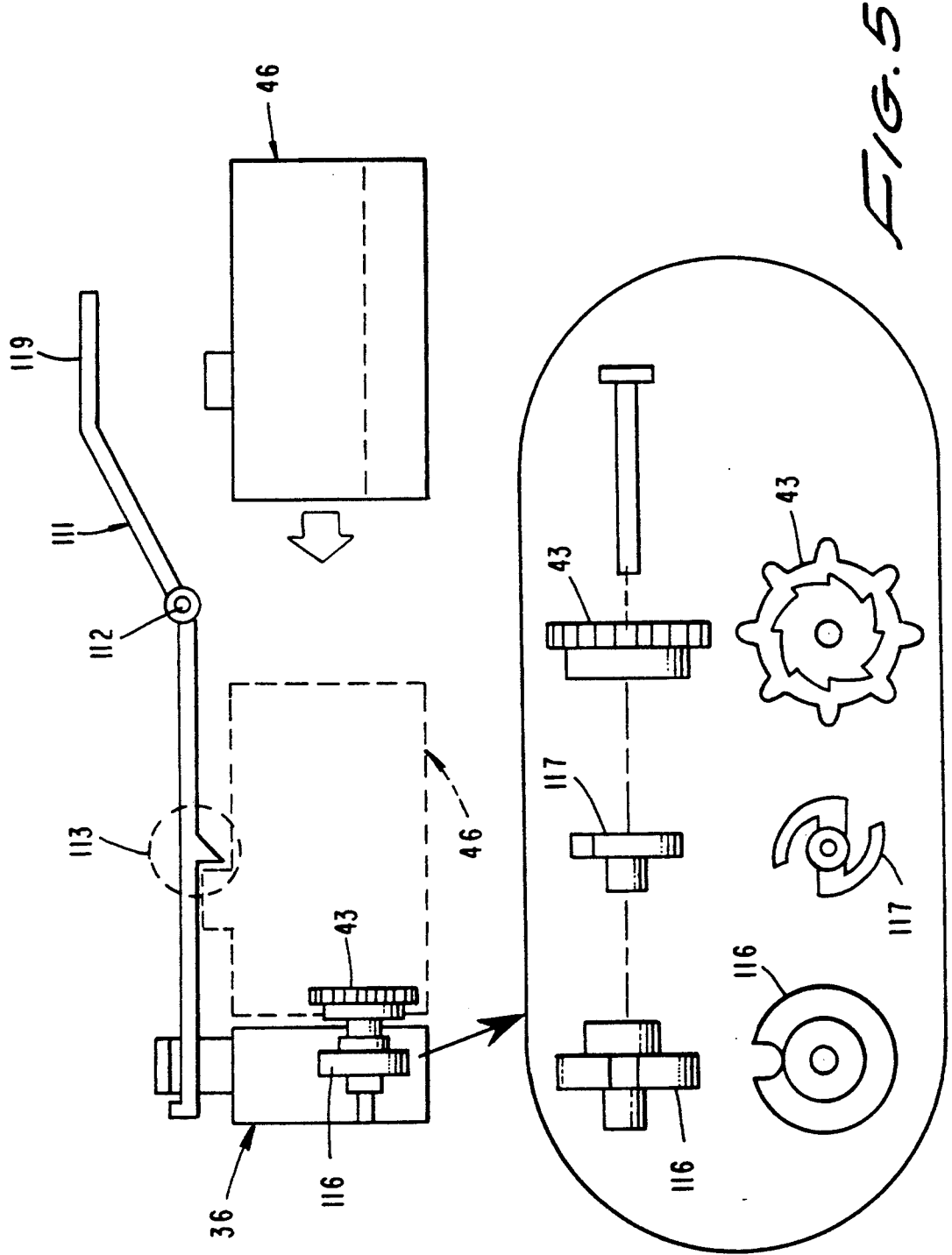
FIG. 5 is a side elevation view of the film frame counting mechanism of the toy embodiment shown in FIGS. 1-4.

FIG. 5 shows the picture cartridge locking mechanism and counting unit. The picture cartridge 46 is shown being inserted into the operational position shown in dotted lines. Lever 111 is pressed down at position 119 to insert the picture cartridge 46. The lever 111 pivots at the position marked 112, lifting the counting unit 36 so the picture cartridge 46 can slide into place. Lever 111 is then released, locking the picture cartridge 46 in place by the tab 113. The counting unit 36 falls into position with the sprocket wheel 43 engaging the film in the picture cartridge 46.

The counting unit 36 operates as follows. When the film in the picture cartridge 46 is advancing, the sprocket wheel 43 turns counter-clockwise, engaging the clutch 117 to turn the detent wheel 116. When the film in the picture cartridge 46 is rewinding, the sprocket wheel 43 turns clockwise, and does not engage the clutch 117 to turn the detent wheel 116.

FIG. 6 shows a block diagram of the electronic circuit for advancing the film. The play switch 12 puts the audio cassette player 61 in the play mode, and supplies power to the phase lock loop 144, to advance motor and solenoid driver 145, and to projector bulb 40. Rewind switch 15 puts the audio cassette player 61 in the rewind mode, and supplies power to the rewind motor 86 to rewind the film in the picture cartridge.

The audio cassette is pre-recorded with the story audio on the left channel, and 1 Khz tone pulses on the right channel. Two channels are used so that the tone pulses are not heard with the story, and so that spurious audio frequencies in the story do not cause false advancement of the slide pictures. The tone pulses are used to synchronize the slide pictures on the film with the story, and are placed on the audio tape at the points in the story where the picture frame is to advance to the next frame. The audio cassette player 61 is a standard stereo player of common type. A speaker 30 is connected to the left channel output to reproduce the audio portion of the story. The right channel output is connected to the input of a phase lock loop circuit 144 which detects the 1 Khz tone pulses. The output of the phase lock loop circuit 144 controls an advance motor and solenoid driver circuit 145 which supplies the drive current for the advance motor 48 and the solenoid 45. When the phase lock loop circuit 144 detects the 1 Khz tone pulse on the tape, the solenoid 45 actuates and pushes the lever off the detent in the sprocket wheel allowing the advance motor 48 to move the film to the next frame at the corresponding point in the story.

Although the invention herein has been described with reference to a particular embodiment, it is to be understood that this embodiment is merely illustrative of the principle and application of the invention. Thus, it is to be understood that numerous modifications may be made in the illustrative embodiment and other arrangements may be devices without departing from the spirit and scope of the invention.

What is claimed is:

1. A synchronized audio visual story-telling toy comprising:
   a housing comprising a projector for directing light through a picture frame and onto a display surface;
   a picture cartridge comprising a strip including a plurality of picture frames arranged in a desired sequence, said cartridge having a size and shape adapted for insertion into said housing such that each of said picture frames can be placed in said desired sequence in the path of said light;
   means for holding said picture cartridge in said housing so that said picture frames pass over said projector;
   motor means for advancing the picture frames on said strip into the path of said light in increments of at least one picture frame at a time, said motor means including shut-off means;
   an audio tape player in said housing including a speaker for reproducing sound corresponding to said picture frames from a pre-recorded audio tape and for reproducing electronic synchronization signals from said tape to actuate said motor means;
   a detector for said electronic synchronization signals; and
   means for starting said motor means in response to said synchronization signals, and for shutting off said motor means after advancing said picture frames on said strip into the path of said light.

2. The toy of claim 1 wherein said advancing means comprises a sprocket wheel with a detent for indicating that a picture frame on said film is aligned with said projector.

3. The toy of claim 2 wherein said advancing means comprises a lever which slides into said detent to stop the film at the position determined by the detent.

4. The toy of claim 3 wherein said advancing means further comprises a solenoid which releases said lever from said detent when said advancing means starts to advance the film.

5. The toy of claim 1 wherein said advancing means comprises a solenoid actuated mechanism.

6. The toy of claim 1 wherein said advancing means comprises a motorized gear drive mechanism.

7. The toy of claim 1 further comprising means to rewind said strip.

8. The toy of claim 7 wherein said means to rewind said strip comprises a motorized gear drive mechanism.

9. The toy of claim 1 wherein said means to detect said electronic synchronization signals comprises a phase lock loop circuit.

10. A synchronized audio/visual story-telling toy for projecting picture on a display surface as a story recorded on an audio tape is played, said toy comprising a picture cartridge containing a plurality of picture frames, a projector for displaying said picture frames one at a time in a desired sequence on a desired surface, motor means for advancing said picture frames into the path of light from said projector in increments of at least one picture frame at a time, means for starting said motor means in response to synchronization signals from said audio tape, and for shutting off said motor means after each advance of said picture frames into the path of said light, said toy being operable such that said picture frames are displayed in synchronization with said story being played.

11. The toy of claim 10 further comprising an audio tape player that includes means for reproducing said story in desired portions synchronized with the display of two or more of said picture frames on said desired surface, and means for detecting electronic synchronization signals on said audio tape, said toy also including means for utilizing said synchronization signals to advance a desired picture frame into position for display from said projector at a desired time.

12. The toy of claim 1 further comprising means for supplying battery power to said motor means and to said audio tape player.

13. The toy of claim 10 further comprising means for supplying battery power to said motor means and to said audio tape player.

14. The to of claim 7 further comprising means for supplying battery power to said motor means and to said audio tape player.

* * * * *